United States Patent [19]

Nishiwaki et al.

[11] Patent Number: 5,374,382
[45] Date of Patent: * Dec. 20, 1994

[54] METHOD OF GENERATION AND RECOVERY OF ULTRA-FINE PARTICLES

[75] Inventors: Akira Nishiwaki; Yasuo Moroboshi; Atsushi Saito; Kazuhiro Fukuda, all of Hino, Japan

[73] Assignee: Konica Corporation, Japan

[*] Notice: The portion of the term of this patent subsequent to Feb. 16, 2010 has been disclaimed.

[21] Appl. No.: 592,366

[22] Filed: Oct. 3, 1990

[51] Int. Cl.$^5$ .............................. B29B 9/00
[52] U.S. Cl. .......................... 264/5; 264/81; 264/85; 264/140; 23/294 R; 118/100; 118/112; 118/726; 159/6.2; 427/255.6; 427/358; 427/368
[58] Field of Search ............ 264/81, 85, 140, 5; 427/368, 358, 255.6; 23/294 R; 118/726, 100, 112; 159/6.2

[56] References Cited

U.S. PATENT DOCUMENTS

| | | | |
|---|---|---|---|
| 2,993,764 | 7/1961 | Grulet et al. | 23/294 R |
| 3,111,461 | 11/1963 | Hickman | 23/294 R |
| 4,242,069 | 12/1980 | Maringer | 264/140 |
| 4,654,229 | 3/1987 | Morita et al. | 427/180 |
| 4,654,268 | 3/1987 | De Boel et al. | 264/140 |
| 4,913,865 | 4/1990 | Toyotama | 264/81 |
| 5,108,862 | 4/1992 | Kishimoto et al. | 430/108 |
| 5,186,872 | 2/1993 | Nishiwaki et al. | 118/726 |

FOREIGN PATENT DOCUMENTS

| | | | |
|---|---|---|---|
| 46-2002 | 1/1971 | Japan | 23/294 R |
| 626789 | 8/1978 | U.S.S.R. | 23/294 R |

Primary Examiner—Wilbur Bascomb, Jr.
Attorney, Agent, or Firm—Jordan B. Bierman

[57] ABSTRACT

The invention provides a method of producing ultra-fine particles and an apparatus therefor. A particle carrier is moved in a chamber which is decompressed and charged with inert gas. An evaporable material is heated so as to deposit evaporated ultra-fine particles onto a part of the moving particle carrier. The deposited ultra-fine particles are collected from the part of the moving particle carrier while evaporated ultra-fine particles deposit onto another part of the moving particle carrier.

15 Claims, 9 Drawing Sheets

FIG. 17(a) (PRIOR ART)
FIG. 17(b) (PRIOR ART)
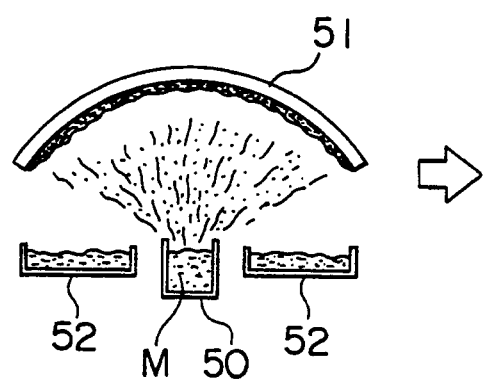
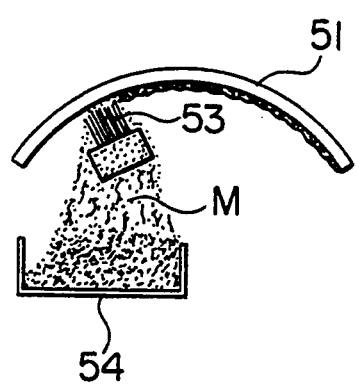
FIG. 18(a) (PRIOR ART)
FIG. 18(b) (PRIOR ART)
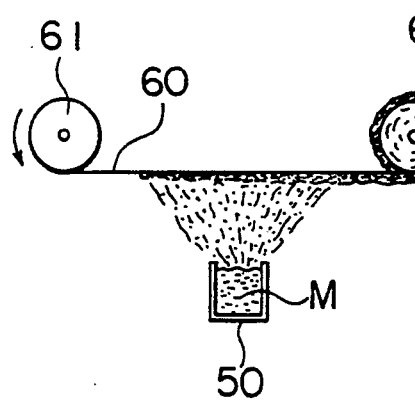
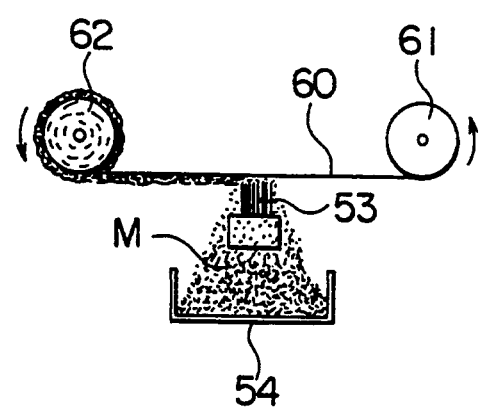

METHOD OF GENERATION AND RECOVERY OF ULTRA-FINE PARTICLES

BACKGROUND OF THE INVENTION

The present invention relates to a method and an apparatus therefor for generating and collecting ultra-fine particles by means of gas evaporation technique, which method and apparatus are for obtaining organic ultra-fine particles such as organic photoconductor ultra-fine particles used for manufacturing an electrophotographic photoreceptor. The invention relates particularly to a method for generating ultra-fine particles through a gas evaporation method which is a method of evaporation in a gas atmosphere and for collecting them and to an apparatus therefor. The method of evaporation in a gas atmosphere is one wherein various kinds of substances are heated, evaporated and sublimated in the atmosphere of inactive gas or inert gas contained in a vacuum container, and a molecule in vapor thus generated is cooled down gradually while it collides with a molecule of the inactive gas, and molecules cohere to form an ultra-fine particle which is then collected.

An electrophotographic photoreceptor has basic structure wherein a light-sensitive layer is formed on an electrically conductive substrate. As a photoconductive substance for forming the light-sensitive layer, selenium has generally been used, and other substances known as inorganic photoconductive substance include cadmium sulfide and zinc oxide.

Recently, however, it is attempted, by using organic photoconductive substance, to improve the layer-forming efficiency and to raise productivity by manufacturing through a coating process. Further, the usage of an organic photoconductive substance offers an advantage in that the color sensitivity can be controlled freely if sensitizers for dyes and the pigments used are selected. As organic photoconductive substance, there has been known poly-N-vinylcarbazole and 2.5-bis (P-diethylaminophenyl)-1,3,4-oxyadiazole.

The organic photoconductive substance functions in the state of ultra-fine particles dispersed in a binder.

Recently, on the other hand, studies on an ultra-fine particle in a size of $\mu$m order or Å order have been made. Such an ultra-fine particle is generated, which shows higher activity when its specific surface area increases.

In this case, a method of evaporation in a gas atmosphere among others is attracting public attention. This method has tended to be the subject for the study only for obtaining ultra-fine particles of inorganic material or metallic material, but the study has also been made to obtain ultra-fine particles of an organic substance as is disclosed on pages 44–49 in 'Functional Materials' of June issue in 1987.

In any case, ultra-fine particles evaporated in a gas atmosphere and deposited on a particle-receiving member have hitherto been collected as shown in FIGS. 17 and 18.

Namely, in the first method, there is provided in a vacuum chamber (not shown), as shown in FIG. 17 (a), container 50 which contains evaporative material M, flat or curved plate 51 that serves as a particle-receiving member, when necessary, recovery container 52 that receives falling particles, and container 50 in which evaporative materials are heated for evaporation under a condition in which the vacuum chamber contains inactive gas and is decompressed to a vacuum, and evaporated materials thus generated are caused to be deposited on aforesaid curved plate 51, and then, as shown in FIG. 17 (b), a layer of material deposited on the surface of curved plate 51 is scraped off by brush 53 or the like to be collected into recovery box 54.

In the second method, evaporative material M is caused to be deposited, in the evaporation embodiment identical no that in the first method, on the surface of web 60 while plastic web 60, which serves as a particle-receiving member, is supplied from reel 61 and is taken up by reel 62 as shown in FIG. 18 (b), and for collecting evaporated material, evaporative material M deposited on the surface of web 60 is scraped off with a brush or the like to be collected into recovery box 54 while web 60 is supplied from reel 62 which once took up web 60.

On the other hand, there is also known the recovery method wherein a web on which evaporative materials are deposited is subjected to supersonic treatment in a solvent for recovery.

However, the aforesaid first method is of a type of a batch system. With the lapse of time, therefore, powder substances are deposited causing gradual lamenation of the recovery plate until the thickness of the lamination reaches a certain value. Therefore, even if the recovery plate is cooled down, the laminated powder layer receives radiant heat emitted from the evaporation source, resulting in remarkable thermal deterioration, especially when the powder is less heat-resistant. Further, in the case of a material having the characteristic of needle-like growth, particles grow to be a cobweb shape (a shape of a filament) and thereby, it is not possible to obtain the target ultra-fine particles. In addition to that, an excessive amount of particles drop during course of lamination, causing the recovery to be difficult. Further, due to the two steps of deposition and recovery, the working efficiency is poor, which is identical to the second method explained below.

In the second method, on the other hand, deposited materials are scraped off between the reels in addition to that the number of steps is two. Therefore, the scraping is unstable and difficult due to the plastic web to which the brush can not be applied with sufficient pressure. Therefore, the efficiency of recovery and the rate of recovery are poor.

On the other hand, the method of recovery wherein a web on which evaporative materials are deposited is subjected to supersonic treatment in a solvent has disadvantages that the separation of evaporative materials from the solvent takes time and labor and a drying step for eliminating solvent is needed.

SUMMARY OF THE INVENTION

From the aforesaid viewpoint, the primary object of the invention is to provide a method for generating and collecting ultra-fine particles and an apparatus therefor wherein the recovery efficiency is excellent, the rate of recovery is high and properties of collected ultra-fine particles are excellent.

In the method of the first embodiment of the invention for solving aforesaid problems, ultra-fine particles evaporated through the method of evaporation in a gas atmosphere are deposited on a particle-receiving member that runs continuously, and aforesaid ultra-fine particles are scraped off while the particle-receiving member is running.

Further, an apparatus for the present embodiment is provided with a means for evaporation of ultra-fine particles, a particle-receiving member having an endless outer surface which is positioned so that it faces the means for evaporation and runs continuously and with a scraping means which is positioned so that it is brought in contact with the particle-receiving member and scrapes off continuously aforesaid ultra-fine particles deposited on the particle-receiving member.

In the present embodiment, evaporative materials are caused to be deposited on the particle-receiving member and at the same time, the deposited ultra-fine particles are scraped off continuously while the particle-receiving member is running. This means that the deposited ultra-fine particles are scraped off immediately after they are deposited, and therefore, the ultra-fine particles are free from the thermal deterioration caused by the evaporation source, and ultra-fine particles excellent in qualities and physical properties can be obtained.

In the second embodiment of the invention, ultra-fine particles evaporated through the method of evaporation in a gas atmosphere are caused to be deposited on a particle-receiving member that runs continously, and ultra-fine particles thus deposited on the running particle-receiving member are vacuum-attracted for recovery through a sucking nozzle that is connected to a vacuum sucking system to form a communication pipe and is positioned so that it faces the aforesaid particle-receiving member.

An apparatus according to the present embodiment is provided with a means for evaporating ultra-fine particles, a particle-receiving member having an endless outer surface which is positioned so that it faces the means for evaporation and runs continuously and with a sucking nozzle which faces the particle-receiving member and is connected to the vacuum sucking system to form a communication pipe.

In the present embodiment, evaporative materials are caused to be deposited on a particle-receiving member, and at the same time, ultra-fine particles thus deposited on the running particle-receiving member are scraped off continuously for collection. Therefor° e, the recovery is free from relative accuracy in terms of manufacturing and machining and operational conditions between the particle-receiving member and a recovery means, resulting in a sure and stable recovery.

In the method according to the third embodiment of the invention, ultra-fine particles evaporated through the method of evaporation in a gas atmosphere are deposited on the particle-receiving member that runs continuously, and the aforesaid deposited ultra-fine particles are wiped off while the particle-receiving member is running.

An apparatus according to the present embodiment is equipped with a means for evaporating ultra-fine particles, a particle-receiving member having an endless outer surface which is positioned so that it faces the means for evaporation and runs continuously and with a wiping means which is positioned so that it is kept in contact with the particle-receiving member and wipes off ultra-fine particles deposited on the particle-receiving member.

In the present embodiment, evaporative materials are caused to be deposited on a particle-receiving member, and at the same time, ultra-fine particles thus deposited on the particle-receiving member are wiped off in the course of movement of the particle-receiving member. Therefore, the collection is free from relative accuracy in terms of manufacturing and machining and operational conditions between the particle-receiving member and a recovery means, resulting in a sure and stable recovery.

Further, since ultra-fine particles deposited on the particle-receiving member are wiped off, for example, by a piece of cloth, the surface of the particle-receiving member is not scratched and a lump of ultra-fine particles will not be mixed in products.

In the method according to the fourth embodiment of the invention, ultra-fine particles evaporated through the method of evaporation in a gas atmosphere are caused to be deposited on a particle-receiving member that rotates continuously and has its cylindrical outer surface, and while it is rotating, aforesaid ultra-fine particles are scraped off for recovery continuously by a brush which has a cylindrical outer surface and is kept in contact with the outer surface of aforesaid particle-receiving member with its axis being in parallel with that of aforesaid particle-receiving member.

Since a brush is used for scraping off ultra-fine particles deposited on a particle-receiving member in the present embodiment, the tip of each bristle of the brush can be pressed, on a spot basis, against the surface of the particle-receiving member, resulting in a sufficient contact pressure which offers an excellent scraping capability. Further, since both the particle-receiving member and the brush have an external cylindrical surface, comparing with the case wherein the contact surface between them is a plane, the force of a tip of a bristle to kick ultra-fine particles when the tip leaves the surface of the particle-receiving member is greater. In addition the scraping is not affected by the accuracy of machining of the surface of the particle-receiving member and the collecting means.

In the method according to the fifth embodiment of the invention, ultra-fine particles evaporated through the method of evaporation in a gas atmosphere are caused to be deposited on a particle-receiving member that rotates continuously and has its outer cylindrical surface, and while the particle-receiving member is rotating, aforesaid ultra-fine particles are removed continuously from the particle-receiving member by a removing means for particle-recovery, and at least the surface of the aforesaid particle-receiving member has antiadhesive property to the particles.

Since at least the surface of the particle-receiving member is repellent to ultra-fine particles in the present embodiment, the ultra-fine particles are easily removed from the particle-receiving member by a removing means.

BRIEF DESCRIPTION OF THE DRAWINGS

FIGS. 17(a) and 17(b) taken together and FIGS. 18(a) and 18(b) taken together each show schematic illustrations of conventional technology.

DETAILED DESCRIPTION OF THE PREFERRED EMBODIMENTS

The present invention will further be explained in detail as follows.

Figure 1:
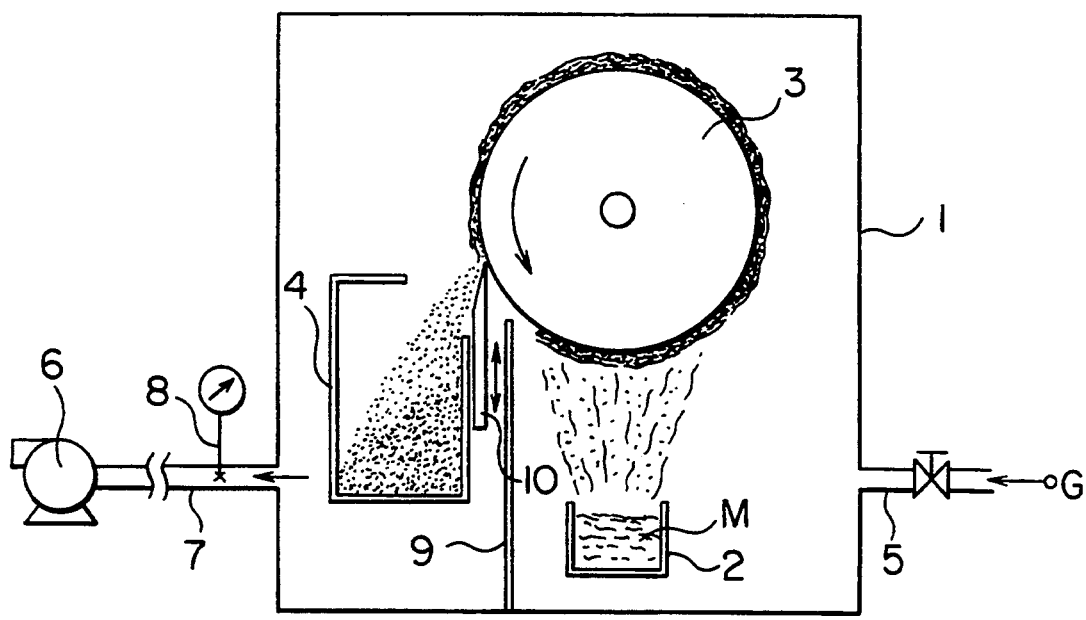
FIG. 1 is a schematic diagram showing the first example of the apparatus construction in the first embodiment of the invention.

FIG. 1 shows the first example of apparatus construction in the first embodiment of the invention, wherein container 2 for evaporative material M and rotating drum 3 and recovery box 4 are arranged in vacuum chamber 1. Supply pipe 5 for inactive gas G such as argon and helium and exhaust pipe 7 connected to vacuum pump 6 are connected to vacuum chamber 1, and exhaust pipe 7 is provided with pressure gauge 8 for detecting the degree of vacuum. Rotating drum 3 is arranged over container 2. Recovery box 4 is thermally isolated by thermal shield board 9 from container 2 and from a portion on rotating drum where evaporative materials are deposited.

On the other hand, assuming that rotating drum 3 rotates counterclockwise in FIG. 1, scraping blade 10 is positioned so that its tip is located at the position of the hour hand of 8 or 9 o'clock with regard to rotating drum 3 to be in contact with, or to be close to, the rotating drum, and below the scraping blade 10, recovery box 4 is provided so that its inlet faces the rotating drum.

In this case, an angle of scraping by scraping blade 10 is preferably a reverse angle, but other angle such as a trail angle or the like is also acceptable.

Further, it is preferable that container 2 for evaporative material M is made of heat-resisting material such as ceramic material, and this container 2 and/or evaporative material M is heated, through heater heating, induction heating, laser heating, resistance heating or electron heating, up to temperature at which the material M can fully be evaporated. In that case, the temperature of rotating drum 3 is kept to be the same as that in vacuum chamber 1, or it is preferably cooled, for example, down to 10° C. or less. It is possible to cool by a cooling medium such as cooling water that runs inside rotating drum 3.

In the apparatus thus constituted, vacuum chamber 1 is decompressed by vacuum pump 6, preferably down to $10^{-5}$–$10^{-4}$ Torr, and is filled with inactive gas G while preferably keeping the vacuum $10^{-2}$–$10^2$ Torr. Under such condition, when evaporative material M is heated, evaporation in a gas atmosphere takes place and evaporated materials M are deposited on the surface of rotating drum 3 continuously. The materials M thus deposited are scraped by scraping blade 10 and collected in recovery box 4. On the clean surface of rotating drum 3 from which materials M have been scraped off, fresh materials are deposited in the next cycle. Thus, deposition and scraping of materials M are repeated continuously on the surface of rotating drum 3.

Namely, materials deposited on the surface of rotating drum are scraped off immediately without being subjected again to radiant heat from the heat source for heating materials. Therefore, it is possible to obtain high quality ultra-fine particles which are not deteriorated by heat (not damaged by heat), which is different from the conventional first method. The period of time from deposition after evaporation to the scraping can be set by adjusting, for example, the speed of revolution of rotating drum 3.

Figure 2:
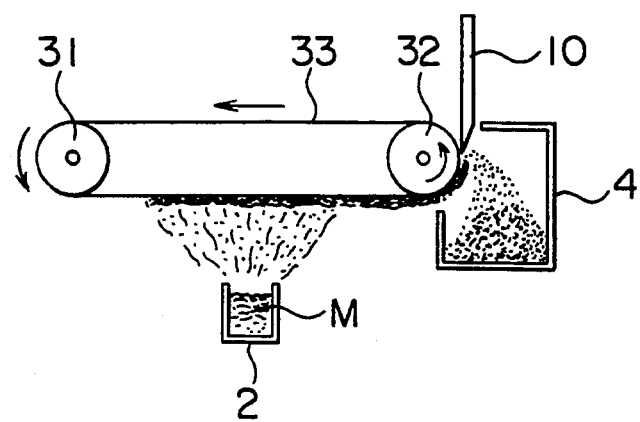
FIG. 2 is a schematic diagram of the second example of the apparatus construction of the invention and FIG. 3 is a diagram showing the correlation between the speed of revolution of a rotating drum and a diameter of a particle related to that speed of revolution.
Figure 3:
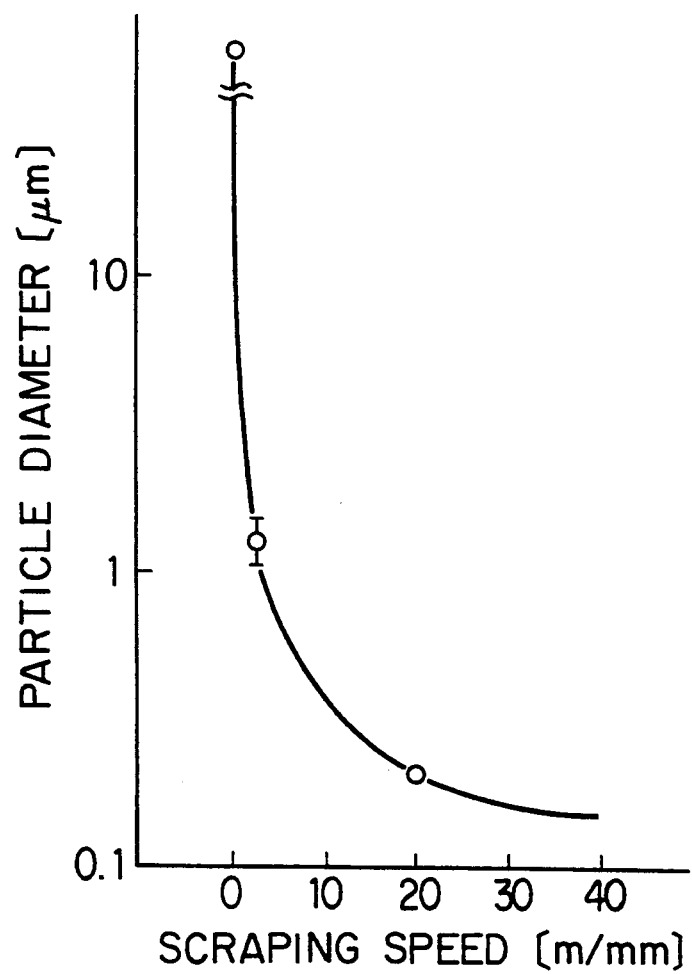

FIG. 2 shows the second example of apparatus construction in the first embodiment, wherein traveling belt 33, in place of rotating drum 3, is spread between roll 31 and roll 32, and scraping blade 10 is arranged so that it scrapes on the surface position of roll 32. In this example, again, the conditions such as that of under vacuum, that in inactive gas and that of heating are the same as those in the first example of apparatus construction, though they are not illustrated.

As is predictable from each of aforesaid examples of apparatus construction, scraping blade 10 is so arranged that the portion where the tip of scraping blade 10 touches onto rotating drum 3 surface or the surface of belt 33 on roll 32 becomes stable, it is suitable to raise the scraping capability.

As stated above, when ultra-fine particles are accumulated to a certain level in recovery box 4, evaporation operation in a gas atmosphere is suspended and the particles are taken out after releasing vacuum chamber 1.

In each of aforesaid examples, evaporative materials are supplied to a container on a batch basis. However, if they are supplied continuously to a heating container in a vacuum chamber by a screw feeder or the like, evaporation in a large amount can be attained.

When obtaining ultra-fine particles in size from 10 Å to scores of thousands Å as a target, the invention can be applied favorably. Further, in addition to the types of inorganic material and metallic material, ultra-fine particles can be of an organic material type. The invention is suitable for obtaining pigments used for an organic photoreceptor and is most suitable for obtaining pigments of an anthanthrone type in particular.

How to obtain an organic photoreceptor will be explained to a certain extent as follows.

An organic photoreceptor is generally obtained in such manner that a foundation layer is coated on the electrically conductive substrate and a carrier generation layer (CGL) and a carrier transfer layer (CTL) are formed on the fundation layer by coating a solution wherein organic photoconductor particles are dipersed by means of a homogenizer in a solvent and a binder resin.

In this case, a photoreceptor to be obtained finally includes a photoreceptor of a mono-layer type wherein organic photoconductor particles (pigments) are dispersed in charge-carrying materials as a charge-generating material on the electrically conductive substrate and a photoreceptor of a separated-function type wherein a charge-generating material layer is formed on the electrically conductive substrate and a charge-carrying material layer is formed on the charge-generating material layer.

In any case, a pigment of an azo type, a pigment of an anthanthrone type, a pigment of a perylene type, a pigment of a phthalocyanine type, a pigment of a quinacridone type, a pigment of a cyanine type, a pigment of a pyrylium type, a pigment of a thiopyrylium type, a pigment of an indigo type, a pigment of a stearic acid type, a pigment of a polycyclic quinone type and others can be used as an organic photoconductor particle to be used for charge-generating materials.

As a solvent for a pigment, it is possible to use various types of solvents including a solvent of an alcohol type such as methanol, ethanol, isopropyl alcohol, a solvent of a ketone type such as acetone, methyl ethyl ketone, methylisobutyl ketone and cyclohexanone, a solvent of an aromatic type such as benzene, toluene, xylene and chlorobenzene, DMF and DMAC. As a dispersing means, it is possible to use the methods including a sand mill, a colloid mill, an atomizer, a ball mill, or the like.

As a binder resin, polyvinyl butyral, formal resins, polyamide resins, polyurethane resins, cellulose type resins, polyesterr resins, polysulfone resins, polycarbonate resins, acryl type resins and styrene type resins are used.

When making a photoreceptor of a separated-function type, a charge-generating layer is formed by coating the aforesaid dispersed solution directly on a conductive substrate or on an interposition-adhesion layer, and then the charge-generating layer thus formed is coated thereon with a solution to form a charge-carrying layer, thus completing the photoreceptor of a separated-function type. In some cases, the charge-generating layer is formed on the charge-carrying layer. The thickness of the charge-generating layer is $5\mu$ or less and it is preferable that the thickness is $0.01-1\mu$ which means a thin layer. The reason for this is the necessity that the most part of the quantity of incident light can be absorbed in the charge-generating layer to generate much charges, and generated charge-carriers can be put in the charge-carrying layer without any deactivation caused by recombination or trapping.

The following coating methods can be applied: the dipping coating method, the spray coating method, the spinner coating method, the bead coating method, the wire bar coating method, the blade coating method, the roller coating method, and the curtain coating method. It is preferable to dry by heating after drying to touch at an atmospheric temperature. Drying by heating can be conducted at 30° to 200° C. for 5 minutes to 2 hours in the stationary atmosphere or in the blast.

The electric charge carrying layer is electrically connected to the above-described electric charge generating layer. The electric charge carrying layer receives the charge carrier from the electric charge generating layer in the presence of the electric field and carries the charge carrier to the surface. In this case, the electric charge carrying layer may be laid on the electric charge generating layer or under the electric charge generating layer. However, it is preferable to lay the electric charge carrying layer on the electric charge generating layer.

It is preferable that the material which carries the electric charge carrier in the electric charge carrying layer (this material will be called the electric charge carrying material hereafter) is not sensitive to the electromagnetic wave range to which the above-described electric charge generating layer is sensitive. In this case, "the electromagnetic waves" include "the light" in a broad sense such as $\gamma$ rays, X rays, ultraviolet rays, visible rays, near infrared rays, and far infrared rays. When the light sensitive wave range of the electric charge carrying layer coincides with or overlaps with that of the electric charge generating layer, the electric charge generated in both layers catches each other, and as a result it can be the cause of the lowered sensitivity.

All publicly known electric charge carrying materials can be used as the electric charge carrying materials. For example, a hydrazone derivative, a pyrazoline derivative, a triphenylamine derivative, a polyvinyl carbazole, and the like can be used.

Other than these organic electric charge carrying materials, inorganic materials such as selenium, selenium-tellurium, amolphous silicon, cadmium sulfide, and the like can be used.

Two of these electric charge carrying materials or not less than three of them can be combined when they are used.

When electric charge carrying materials do not have the property of forming a film, an adequate binder can be used so that the materials can form a film. The following insulation resins can be used as the binder: acrylate resin, polyacrylate, polyester, polycarbonate, polystyrene, acrylonitrile-styrene copolymer, acrylonitrile butadiene copolymer, polyvinyl butyral, polyvinyl formal, polysulfone polyacrylic amide, polyamide, and chlorinated rubber. Further, the following organic photoconductive polymers can be used: poly-N-vinyl carbazole, polyvinyl anthracene, and polyvinyl pyrene.

The following conductive materials can be used as the conductive substrate, for example: aluminium, aluminium platinum, copper, zinc, stainless steel, vanadium, molybdenum, chromium, titanium, nickel, indium, gold, and platinum. Furthermore, the following can be also used: plastics (for example, polyethylene, polypropylene, polyvinylchloride, polyethylene terephthalate, acrylic resin, polyethylene fluoride, and the like) having a layer of aluminium, aluminium alloys, indium sulfide, tin oxide, indium oxide-tin oxide alloys, and the like formed by the method of vacuum deposition; a substrate of plastic on which conductive particles (for example, carbon black, silver particles, and the like) are covered together with appropriate binders; a substrate of plastic or paper into which conductive particles are impregnated; and plastic having conductive polymers.

A foundation layer having the barrier function and the adhesion function may be provided.

EXAMPLE (I)

In order to clarify the effect of the present invention, the examples of the present invention will be explained as follows.

EXAMPLE I-1

Evaporation in a gas atmosphere was conducted with the device illustrated in FIG. 1.

Ultra-fine particles of organic pigments which are used for producing organic photoreceptor for use in electrophotography, were made and recovered. The abovedescribed ultra-fine particles of organic pigments were obtained according to the method shown in FIG. 1 in such a manner that: 4, 10-dibromo anthanthrone was used; the vacuum chamber was set under the atmosphere of helium gas; and the pressure was reduced to $10^{-1}$ Torr; the material was heated to 300° to 350° C. and evaporated in a vacuum.

As a result, ultra-fine particles without heat deterioration was obtained at the recovery of 45%. In this example, the drum had the diameter of 300$\phi$ and a length of 550 L.

EXAMPLE I-2

The diameters of the particles recovered at the speed of the rotative drum, namely at the scraping speed, under the same conditions as Example I-1, were investigated. According to the results, it was observed that the particle size is dependent on the scraping speed. Consequently, it was proved that the particle size could be controlled by adjusting the revolution speed of the rotative drum.

COMPARATIVE EXAMPLE 1

The same organic pigment was obtained by the conventional method 1 shown in FIG. 17. The result was as follows: the shape of the recovered particle was like a thread; the color inside the particle was orange and the color of the surface was scarlet, so that the heat deterioration was clearly recognized; and the recovery was 35 to 40% even though the curved plate 51 was expanded overall in a vacuum chamber.

COMPARATIVE EXAMPLE 2

The same organic pigment was recovered by the conventional method 2 shown in FIG. 18. As a result, ultra-fine particles was obtained. However, the operation time was 200 times as much as that of Comparative Example 1 (the total operation time was 50 hours). Furthermore, since a large amount of ultra-fine particles are adhered on a reverse surface of a plastic web 60 and the particles are scatterd away in the time of collecting, the recovery was 6 to 7%, which was very low.

As explained above, the present embodiment is very excellent in the recovery and the recovery efficiency is high, and further the ultra-fine particles which are excellent in the characteristic can be produced and recovered.

Figure 4:
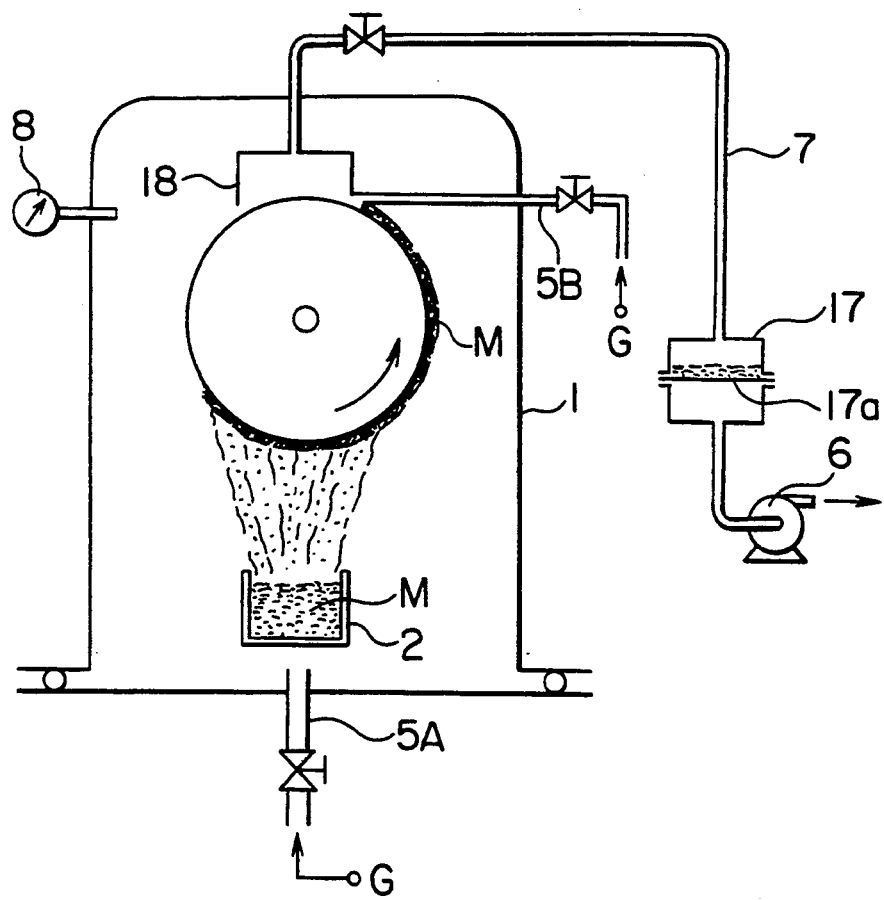
FIG. 4 is a schematic diagram showing the first example of apparatus construction in the second embodiment of the invention.

FIG. 4 shows the composition of the apparatus of the second embodiment of the present invention. The supply pipes 5A, 5B by which the inert gas such as argon, helium, and the like is supplied, and the exhaust pipe 7 which is connected to the vacuum pump 6 are respectively connected to the vacuum chamber 1. The trapping chamber 17 having the filter 17a which traps ultra-fine particles, is provided to the middle portion of the exhaust pipe 7. Further, the tip of the exhaust pipe 7 is provided with the suction nozzle 18, the length of which is the same as the width of the rotative drum 3, and the suction nozzle 18 is located close to the surface of the rotative drum 3. Furthermore, the pressure gauge 8 is provided which is connected to the vacuum chamber 1 so that the pressure inside the vacuum chamber can be measured.

When the operation of the present apparatus is shafted, the pressure in the vacuum chamber 1 is reduced by the vacuum pump 6 so that a good vacuum can be made in the vacuum chamber 1. Then, the inert gas is supplied to the vacuum chamber 1, wherein the pressure is preferably kept to be 0.01 to 100 Torr. When material M having property of evaporation is heated under the condition described above, the vapor is generated and vaporized material M is continuously adhered to the surface of the rotative drum 3.

When material M which has been adhered to the surface of the rotating drum 3, reaches the position opposed to the suction nozzle 18, the adhered material M is sucked by the vacuum suction of the vacuum pump 6 through the suction nozzle 18, and the sucked material M is led to the trapping chamber 17 through the exhaust pipe 7. At this moment, material M is trapped by the filter 17a.

When the trapped material M has reached an appropriate amount, the operation of the vacuum pump 6 is stopped. Then, the filter 17a is taken out from the trapping chamber 17 and material M on the filter 17a is shaken off and recovered.

The following new material is adhered to the surface of the rotative drum 3 from which material M has been scraped off. In this way described above, the adhesion and trapping by suction are continuously conducted on the surface of the rotative drum 3.

Figure 5:
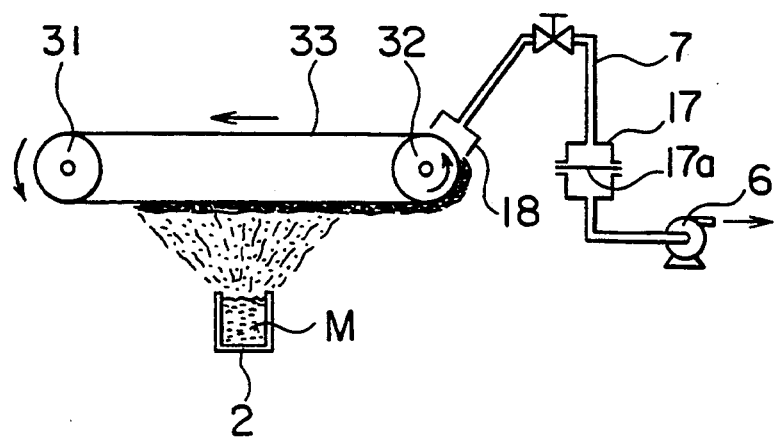
FIG. 5 is a schematic diagram showing the second example thereof and FIG. 6 is that of the third example thereof.
Figure 6:
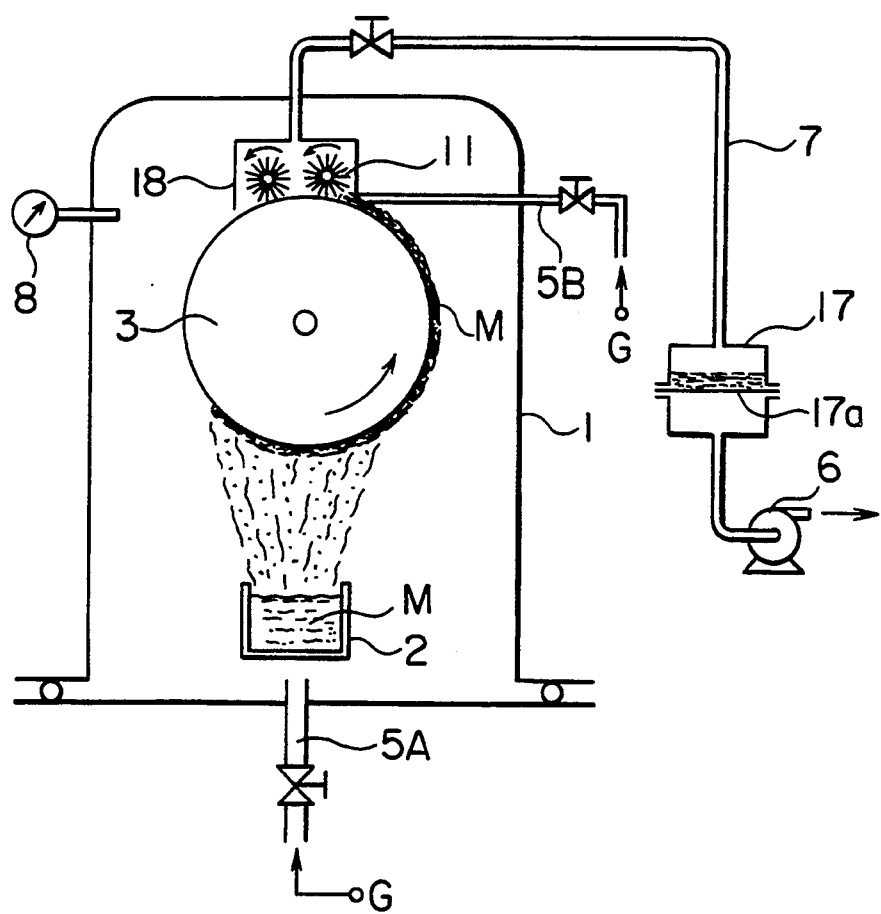

FIG. 5 shows the second example of the apparatus composition of the second embodiment. In the example, the traveling belt 33 is stretched between the rollers 31 and 32 instead of the rotative drum 3, and further the suction nozzle 18 is provided to the position close to the surface of the roller 32 so that material M can be sucked and trapped. In this example, material M is heated in a vacuum and in the inert gas in the same way as the example of the first apparatus composition, wherein the heating in a vacuum and in the inert gas is not illustrated in the drawing. FIG. 6 shows the third example of the appratus composition of the second embodiment. In this example, the rotative scraping brush 11 is provided in the suction nozzle 18 in such a manner that the brush 11 comes into contact with the surface of the rotative brush 3.

In this example, material M adhered onto the surface of the rotative drum 3 is scraped off by the rotation of the rotative brush 11, and at the same time the scraped material M is sucked and recovered through the suction nozzle 18. This example has the following effect. In this example, the removing force by the rotative brush 11 which removes the adhered material M from the surface of the rotative drum 3, is added to the vacuum suction force, so that the material which is strongly adhered to the roller surface can be easily removed.

EXAMPLE II

Evaporation in a gas atmosphere was conducted by the apparatus illustrated in FIG. 4. Ultra-fine particles of an organic pigment which is used for producing the photoreceptor for use in electrophotography, was generated and recovered. As the organic pigment, 4, 10-dibromo anthanthrone was used. The vacuum chamber was set in a helium gas atmosphere and its pressure was reduced to $10^{-1}$ Torr. The material was heated to 300° to 350° C. so that vacuum evaporation could be conducted, and ultra-fine particles were obtained according to the method shown in FIG. 4.

As a result, ultra-fine particles without heat deterioration could be obtained at the recovery of about 45%. The drum used in this example had the diameter of 300$\phi$ and a length of 550 L.

According to the present embodiment, ultra-fine particles can be generated and recovered in such a manner that: particles can be excellently recovered; the recovering efficiency is high; the characteristic of the recovered particles is excellent; and ultra-fine particles can be efficiently generated and recovered for a long period of time without depending on the machining accuracy of the drum surface.

Figure 7:
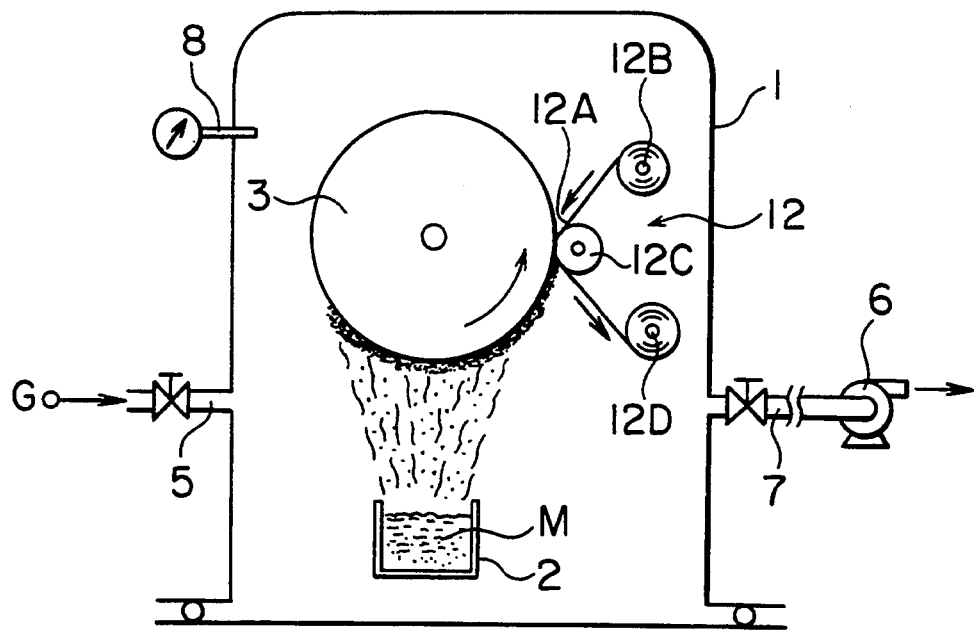
FIG. 7 is a schematic diagram showing the first example of apparatus construction in the third embodiment of the invention.

FIG. 7 shows the apparatus composition of the first example of the third embodiment of the present invention. In this example, the wiping means 12 is provided in the vacuum chamber 1 in such a manner that: the wiping means 12 comes into contact with the rotative drum 3 and wipes the ultra-fine particles away from the drum surface. The wiping means 12 is specifically provided with the supply roller 12B to supply the wiping cloth 12A such as nonwoven fabric, the pressing roller 12C which presses the wiping cloth 12A against the rotative drum 3, and the winding roller 12D which winds the wiping cloth 12A on which ultra/fine particles are attached.

Material M which attached to the surface of the rotative drum 3, is wiped away by the wiping means. Namely, the wiping cloth 12A is fed from the supply roller 12B and pressed against the surface of the rotative drum 3 by the pressing roller 12C, and simultaneously with that, the wiping cloth 12A is moved in the direction opposite to the movement of the surface of the drum 3. At that moment, the ultra-fine particles adhered to the surface of the rotative drum 3 are trapped by the wiping cloth 12A as if the particles were transferred onto the surface of the wiping cloth 12A. After that, the wiping cloth 12A is wound by the winding roller 12D.

The following new material is adhered to the surface of the rotative drum 3 from which material M is wiped away. In the way described above, material M is continuously adhered to the drum 3 surface and continuously trapped by the wiping cloth 12A on the surface of the rotative drum 3.

After material M is trapped once, the operation of the vacuum pump 6 is stopped, and the winding roller 12D is taken out from the vacuum chamber 1 together with the wiping cloth 12A. Then, the wiping cloth 12A is vibrated so that the ultra-fine particles can be shaken off from the surface of the wiping cloth 12A and recovered.

The period from the evaporation and adhesion to the wiping and trapping can be set by adjusting the rotating speed of the rotative drum 3, for example. The wiping cloth 12A may be moved in the direction reverse to the example explained above. However, particles can be effectively wiped away when the wiping cloth 12A is moved in the direction opposite to the movement of the rotative drum 3 as described in the example. It is preferable that the speed of the wiping cloth 12A is slower than the circumferential speed of the rotative drum 3.

Figure 8:
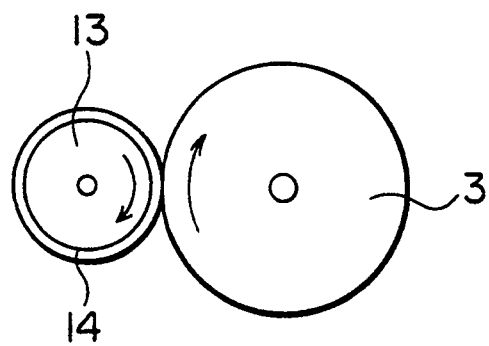
FIG. 8 is that showing the second example thereof.

FIG. 8 shows the second example of the apparatus composition of the third embodiment. The pressing roller 13 which is covered by the adhesive material 14, for example silicone rubber, is pressed against the rotative drum 3 so that the ultra-fine particles adhered to the rotative drum 3 can be adhered onto the adhesive material and trapped. In the same way as the first example of the apparatus composition, the processing in a vacuum and in an inert gas atmosphere, and heating are conducted in this example, which is not illustrated. The ultra-fine particles which have been adhered to the adhesive material 13 can be shaken off by giving vibration and recovered.

Figure 9:
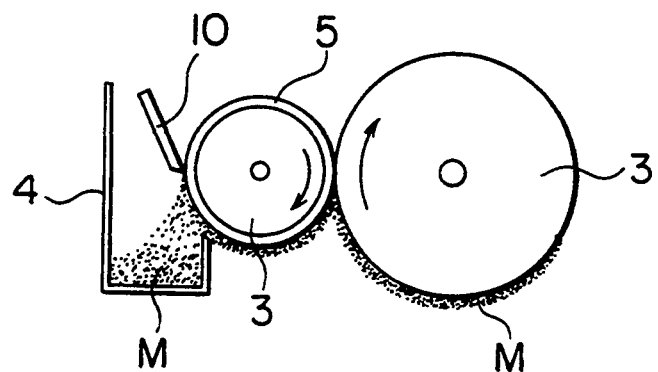
FIG. 9 is that showing the third example thereof.

FIG. 9 shows the third example of the appratus composition of the third embodiment. In this example, the cloth 15 is wound around the pressing roller 13 so that the ultra-fine particles can be trapped by the cloth. If necessary, the scraping blade 10 is pressed against the cloth 15 as illustrated in the drawing so that the trapped ultra-fine particles can be scraped off and continuously recovered into the recovering box 4.

Figure 10:
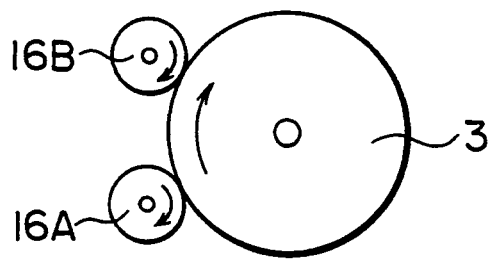
FIG. 10 is that showing the fourth example thereof.

As illustrated in FIG. 10, a plurality of trapping rollers 16A, 16B can be provided as the variation of the second and third examples of the composition. In this case, it is preferable that the trapping roller 16B in the latter stage comes into contact with the rotative drum 3 with a higher pressure than the trapping roller 16A in the former stage.

Figure 11:
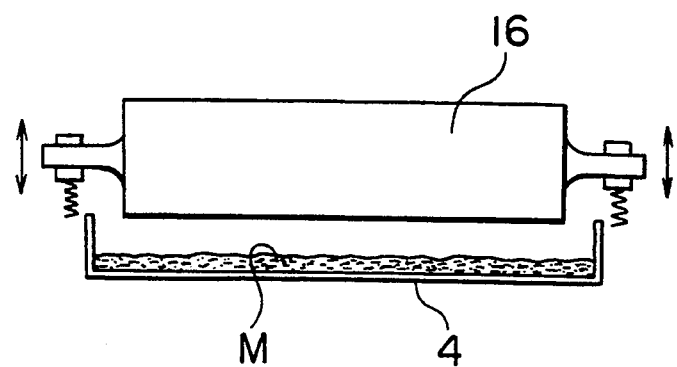
FIG. 11 is a schematic diagram showing an example of shaking off ultra-fine particles collected.

FIG. 11 shows an embodiment in which the ultra-fine particles trapped by the trapping roller 16 are shaken off into the recovering box 4 by vibration.

EXAMPLE III

Evaporation in a gas atmosphere was conducted by the apparatus illustrated in FIG. 7. The ultra-fine particles of an organic pigment which are used for producing an organic photoreceptor for use in electrophotography, were generated and recovered according to the method illustrated in FIG. 7 in such a manner that: 4, 10-dibromo anthanthrone was used as the organic pigment; the vacuum chamber was set in a helium gas atmosphere; the pressure was reduced to $10^{-1}$ Torr; the material was heated to 300° to 350° C. and evaporated in a vacuum.

The result was that the ultra-fine particles could be obtained at the recovery of 50%. The drum used in this example had the diameter of $300\phi$ and a length of 550 L.

Figure 12:
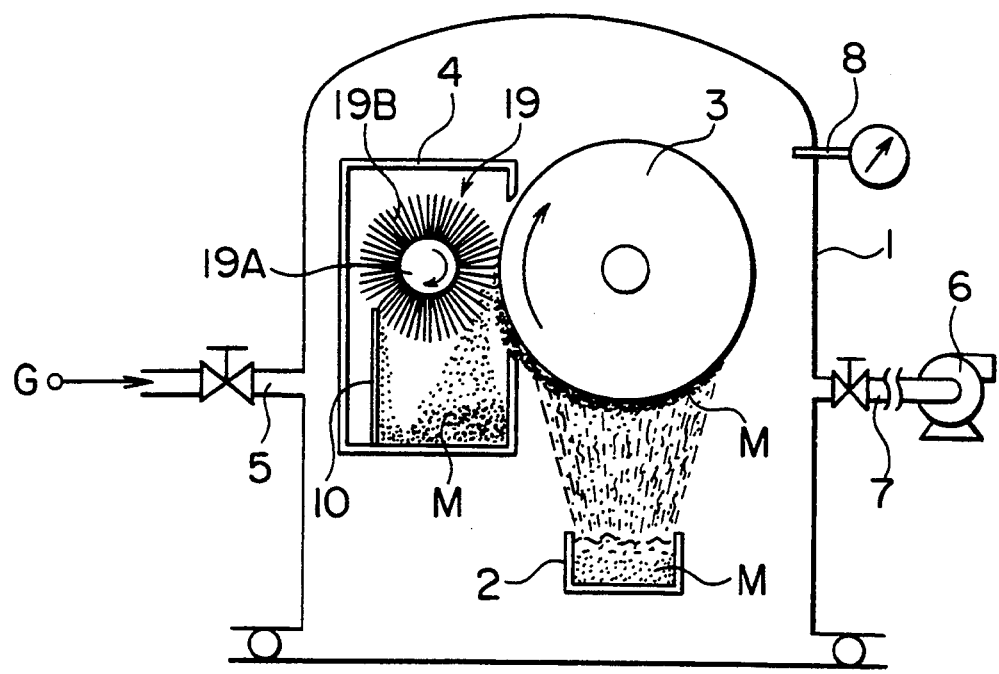
FIG. 12 is a schematic diagram showing the first example of apparatus construction in the fourth embodiment of the invention.

FIG. 12 shows the first example of the apparatus composition of the fourth embodiment. In the vacuum chamber 1, the vessel 2 for material M having the evaporating property, the rotative drum 3 which is cylindrical, and the recovery box 4, a portion of which is opened so that the portion can be opposed to the rotative drum 3, are provided. The supply pipe 5 for the inert gas such as argon and helium, and the exhaust pipe 7 which is connected with the vacuum pump 6, are connected to the vacuum chamber 1, and the vacuum gauge 8 to detect the degree of vacuum is provided to the exhaust pipe 7. The rotative drum 3 is located above the vessel 2. The recovery box 4 is made of heat insulating material and thermally insulated from the portions of the vessel 2 and the rotative drum 3 to which material M is deposited.

On the other hand, the cylindrical brush 19 having many bristles 19B around the brush roller 19A, is provided in such a manner that the cylindrical brush 19 comes into contact with the surface of the rotative brush 3 through the opening of the recovery box 4, wherein the rotative shaft of the cylindrical brush 19 is provided in parallel with the rotative shaft of the rotative drum 3. Further, in this example, the rotative drum 3 is rotated clockwise by a motor not illustrated in the drawing and the brush roller 19A is rotated clockwise by a motor not illustrated in the drawing, so that the brush 19 is also rotated clockwise. The shaking-off blade 10 is fixed to the recovery box 4 in such a manner that the tip of the shaking-off blade 10 is set in the rotating region of the bristles 19B of the brush 19.

In the apparatus composed in the above-described way, the pressure in the vacuum chamber 1 is reduced by the vacuum pump 6 so that a high vacuum condition can be made. Then the inert gas is supplied, and the pressure in the vacuum chamber 1 is preferably kept to be 0.01 to 100 Torr. When material M having the evaporating property is heated under the condition described above, evaporation occurs in the gas atmosphere and the evaporated material M is continuously adhered to the surface of the rotative drum 3 which is rotating. The adhered material M is scraped off by the brush 19 which comes into contact with the rotative drum 3, and is recovered into the recovery box 4. Material M adhered to the bristles 19B is scraped off by the blade 10 since the tips of the blade 10 come into contact with the bristles 19B. The following new material is adhered to the surface or the rotative drum 3 from which material M has been scraped off. In the way described above, material M is continuously scraped off and adhered to the surface of the rotative drum 3. Consequently, material M which has been adhered to the surface of the rotative drum 3 is quickly scraped off from the surface without receiving the radiation heat emitted from the heat source used for heating material, so that the heat deterioration (the heat damage) which occurs in the conventional first method can be eliminated and ultra-fine particles of high quality can be obtained. The period from evaporation and adhesion to scraping-off can be set by adjusting the rotating speed of the rotative drum 3, for example.

When a certain amount of ultra-fine particles are recovered into the recovery box 4, the ultra-fine particles are taken out by opening the vacuum chamber 1 after evaporation in a gas atmosphere has been stopped.

Figure 13:
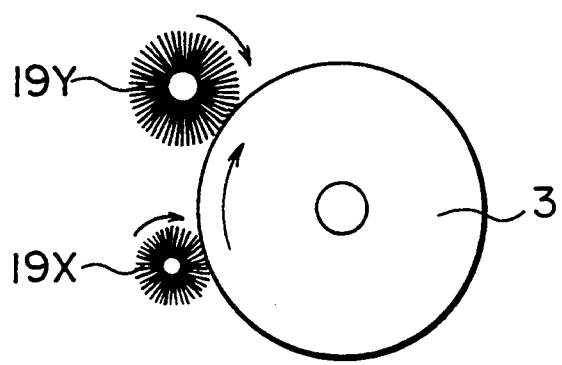
FIG. 13 is that showing the second example thereof.

FIG. 13 shows the second example of the apparatus composition of the fourth embodiment. In the example illustrated in the drawing, two brushes 19X,19Y are provided. In this case, the scraping force of the brush 19Y can be made strong than that of the brush 19X.

Figure 14:
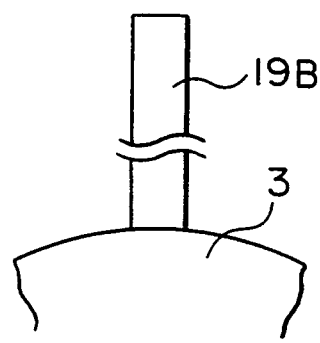
FIG. 14 is an enlarged view showing an example of a form of each bristle of a brush.

The material, implanting density, height and size of the bristles 19B can be appropriately selected. As for the material, the metal fabric is usually used. However, wen material M tends to generate static electricity and sticks to the brush, carbon fabric can be used as the bristles 19B. It is preferable that the shape of the bristle tip is square rather than spherical as illustrated in FIG. 14. Although an appropriate material can be used as the rotative drum 3, a metal can be usually used.

Figure 15:
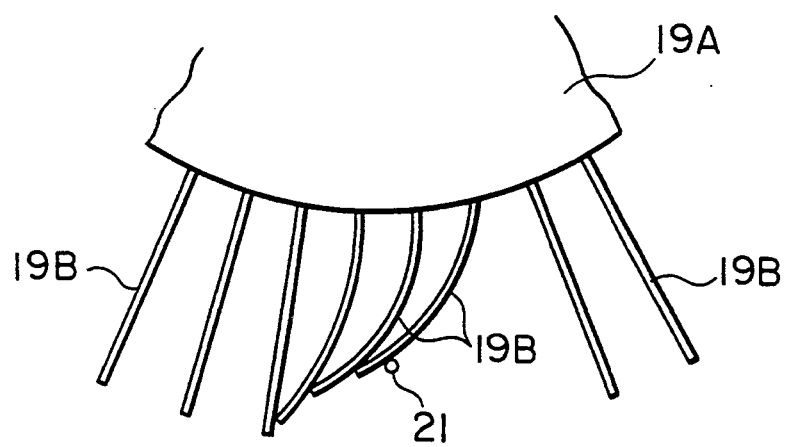
FIG. 15 is a schematic diagram showing an example of arrangement of bristles for shaking off ultra-fine particles sticking to the bristles of a brush.

In order to shake off material M adhered to the rotative drum 19, the shaking-off string 21 can be stretched in the rotating region of the bristles 19B as illustrated in FIG. 15.

On the other hand, in order to effectively scrape off material M from the rotative drum 3, the brush 19 can be oscillated in the direction perpendicular to the surface of the rotative drum 3 or in the direction parallel with the shaft of the rotative drum 3.

EXAMPLE IV

Evaporation in a gas atmosphere was conducted by the apparatus illustrated in FIG. 12. Ultra-fine particles of an organic pigment which is used for producing the photoreceptor for use in electrophotography, was generated and recovered. As the organic pigment, 4, 10-dibromo anthanthrone was used. The vacuum chamber was set in a helium gas atmosphere and its pressure was reduced to $10^{-1}$ Torr. The material was heated 300° to 350° C. so that vacuum evaporation could be conducted, and ultra-fine particles were obtained according to the method shown in FIG. 12.

As a result, ultra-fine particles without heat deterioration could be obtained at the recovery of about 45%. The drum used in this example had the diameter of 300φ and a length of 550 L.

In the fifth embodiment of the present invention, the surface of the rotative drum 3 is covered by fluororesin so that the ultra-fine particles adhered to the surface can be easily removed.

However, it should be understood that the present embodiment is not limited to the specific ultra-fine particle removing method, wherein the method is used when the ultra-fine particles M are removed from the rotative drum 3.

Figure 16:
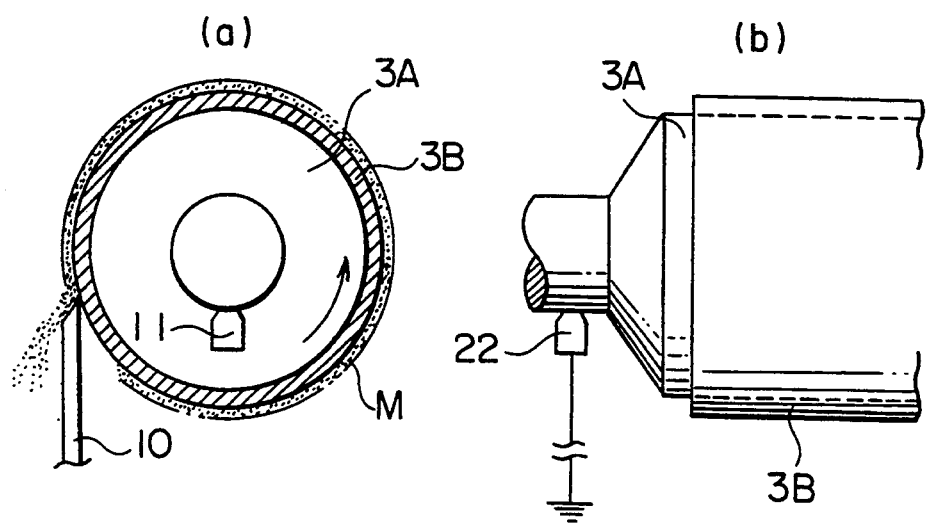
FIG. 16 is a schematic view of the fifth embodiment of the invention, wherein (a) is a side view and (b) is a front view.

FIG. 16 shows the example in which the present embodiment is applied to the above-described first embodiment. In this embodiment, the scraping blade 10 comes into contact with the rotative drum 3 so that ultra-fine particles M adhered to the surface of the rotative drum 3 can be scraped off. Further, in the example, the rotative drum 3 is used which is characterized in that: the nonadhesive material made from fluororesin is covered on the surface of the metal roller 3A. In the present embodiment, the whole of the rotative drum 3 can be made from the nonadhesive material to which the ultra-fine particles can not be adhered, and only the surface of the rotative drum 3 can be made from the nonadhesive material as illustrated in the drawing. Furthermore, when static electricity is generated on the surface of the rotative drum 3 and there is caused a problem in removing ultra-fine particles M, the metal roller 3A may be grounded by connecting the earth brush 22 to the metal roller 3A as illustrated in the drawing or to the surface of the nonadhesive material not illustrated in the drawing.

The present embodiment can be applied to the second to the fourth embodiments in the same way.

In the present embodiment, the surface of the rotative drum to which the ultra-fine particles are adhered to, is made from material having nonadhesive property. Plastic, especially fluororesin is preferably used. The following are the examples of fluororesin: tetra-fluoroethylene resin (PTFE), tetra-fluoroethylene perfluoro alkyl vinyl ether copolymer (PFA), tetra-fluoroethylene propylene copolymer hexafluoride (FEP), ethylene resin trifluoride (PCTFE), vinyl resin fluoride (PVF), and vinylidene resin fluoride (PVDF).

The units, for example the recovery box 4, other than the rotative drum 3 can be made from the nonadhesive material in the same way.

EXAMPLE V

Evaporation in a gas atmosphere was conducted by the apparatus illustrated in FIG. 16. Ultra-fine particles of an organic pigment which is used for producing the photoreceptor for use in electrophotography, was generated and recovered. As the organic pigment, 4, 10-dibromo anthanthrone was used. The vacuum chamber was set in a helium gas atmosphere and its pressure was reduced to $10^{-1}$ Torr. The material was heated to 300° to 350° C. so that vacuum evaporation could be conducted, and ultra-fine particles were obtained according to the method shown in FIG. 1. The rotative drum which was made from PTFE resin was used.

As a result, ultra-fine particles without heat deterioration could be obtained at the recovery of about 60%. The drum used in this example had the diameter of 300φ and a length of 500 L.

COMPARATIVE EXAMPLE 3

Comparative Example 3 is the same as Example V except the rotative drum, wherein a drum made from stainless steel was used in Comparative Example 3. As a result, the conditions were variously changed. However, the recovery was 45 at most. It was confirmed:

when the apparatus was continuously operated for about 3 hours, the residual ultra-fine particles formed into a film was adhered to the surface of the rotative drum.

As explained above, according to the method and apparatus of the present invention, the ultra-fine particles can be completely removed, the ultra-fine particles can be effectively recovered, and the characteristic of the generated and recovered ultra-fine particles is excellent.

What is claimed is:

1. A method of producing ultra-fine particles comprising;
    supplying an evaporatable material in a vacuum chamber in which a movable particle carrying member is located;
    injecting an inert gas into said vacuum chamber;
    heating the evaporatable material to evaporate ultra-fine particles;
    moving the particle carrying member in a stream of evaporated ultra-fine particles whereby said ultra-fine particles are deposited on a first position of a surface of said particle carrying member; and
    collecting the deposit of ultra-fine particles from a second position on said surface of said particle carrying member while additional ultra-fine particles are deposited on said first position of said surface of said particle carrying member.

2. The method of claim 1, wherein the evaporable material is an organic dye material.

3. The method of claim 1, wherein the evaporable material is an organic dye material for an electrophotographic photoreceptor.

4. The method of claim 3, wherein the evaporable material is a pigment of an anthanthrone type.

5. The method of claim 1, wherein the collecting is carried out by scraping.

6. The method of claim 5, wherein the scraping is carried out by a blade.

7. The method of claim 5, wherein the scraping is carried out by a brush.

8. The method of claim 1, wherein the collecting is carried out by sucking with a vaccum.

9. The method of claim 1, wherein the collecting is carried out by wiping.

10. The method of claim 9, wherein the wiping is carried out by a cloth.

11. The method of claim 9, wherein the wiping is carried out by a roller.

12. The method of claim 1, wherein the evaporable material is heated higher than 38° C.

13. The method of claim 1, wherein the particle carrying member is cooled lower than 10° C.

14. The method of claim 1, wherein the vacuum chamber is decompressed around $10^{-2}$ to $10^2$ Torr.

15. The method of claim 1 wherein the moving speed of said particle carrying member is adjustable to control a size of said ultra-fine particles.

* * * * *